Feb. 16, 1965 E. H. ZIEBOLD 3,169,785
BELLOWS EXPANSION UNIT
Filed Nov. 9, 1961
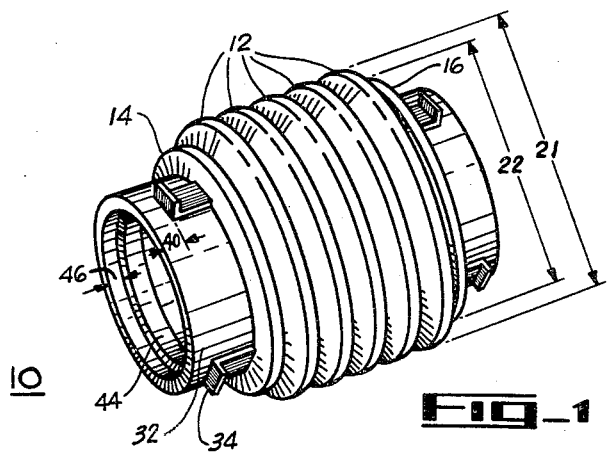
FIG_1
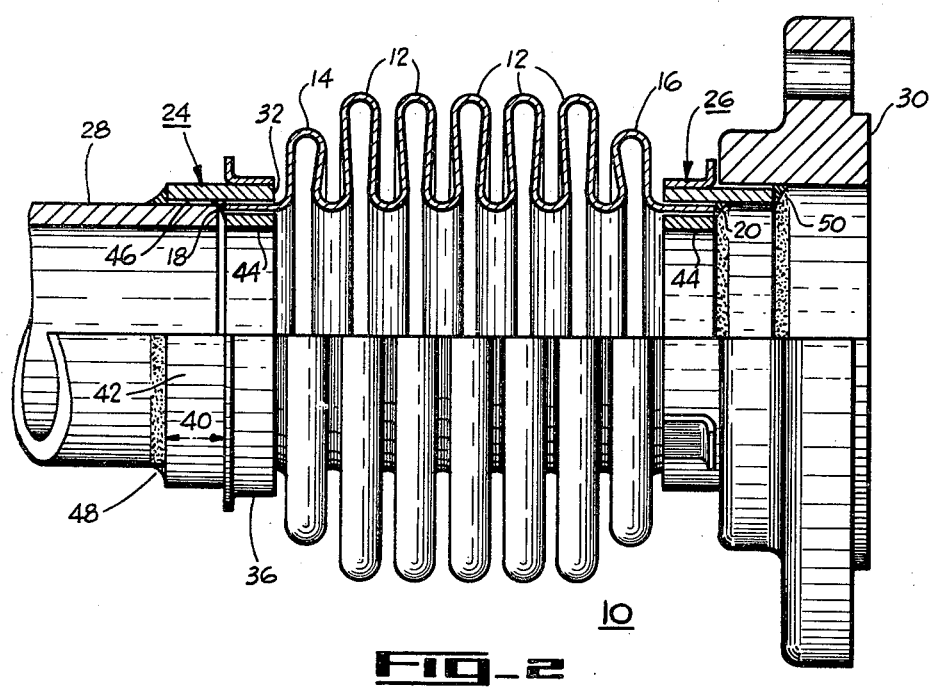
FIG_2
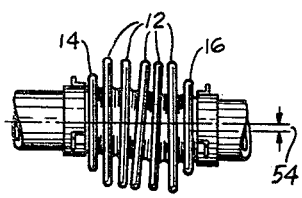
FIG_3
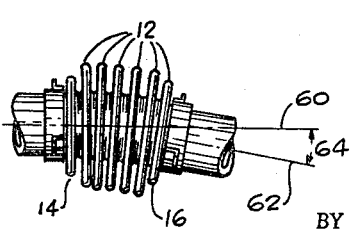
FIG_4
INVENTOR.
EUGENE H. ZIEBOLD.
BY
ATTORNEY.

United States Patent Office 3,169,785
Patented Feb. 16, 1965

3,169,785
BELLOWS EXPANSION UNIT
Eugene H. Ziebold, 5711 La Jolla Blvd., La Jolla, Calif.
Filed Nov. 9, 1961, Ser. No. 151,362
1 Claim. (Cl. 285—226)

This invention relates to an improved bellows expansion unit for use in pipe lines utilizing expansion joints. The invention concerns itself more particularly with the improvement of a flexible conduit structure or bellows expansion portion of the unit by increasing its operation life and distributing flexure more uniformly along the flexible conduit.

Flexible conduits, also referred to herein as "bellows expansion units," are used particularly in pipe lines which conduct high temperature, high pressure fluids or gases, therethrough from one place to another. As the temperature or pressure of the fluid or gases conducted, varies, the pipe lines are subjected to normal expansion or contraction, as well as other types of movement normal to pipe line installations, including axial motion, angularity or rotation about the center line, bending of pipe lines, lateral or parallel offset of one pipe line with respect to the other, and a combination of movement which may be either axial and angular or axial and offset, or axial angular and offset, or a type of universal joint motion. In order to permit such movement between pipe line runs, the use expansion joints and expansion joints of a bellows expansion unit type are known. In the prior art, these bellows expansion units have been used with bellows which at neutral position employ uniformly sized bellows of like diameter dimensions.

In practice, I have found that as the expansion unit takes up movement between connecting pipe lines, that the first bellows span at each end of the expansion unit appears to have a disproportionate amount of movement or motion with respect to the remainder of the bellows spans. This may cause early fatigue of the bellows expansion unit at or adjacent the first bellows span on either end of the expansion unit. In accordance with the the present invention, this difficulty has been solved in that the expansion unit has its bellow span at the end of the bellows formed of a lesser diameter than that of the remaining bellows spans. Thus I increase the resistance to movement at the extreme ends of the expansion unit and cause that movement to be transmitted for more uniform action to the remaining bellows spans. In this manner the fatigue aforestated in the first bellows span on either end of the expansion unit, is overcome. The lesser diameter bellow span at either end is referred to herein as a snubber span. The snubber span has a resilience less than, and a diameter less than that of the remaining bellows spans formed intermediate the two snubber spans.

In addition to the aforementioned objects and advantages, it is also an object of this invention to provide an improved bellows expansion unit wherein the motion normally acting upon the bellows unit is transmitted with greater uniformity throughout the entire series of bellows spans.

It is another object of the present invention to provide greater rigidity at the extremities of the bellows spans, to increase the effectiveness and efficiency of the bellows expansion unit in all of the movements to which it is normally subjected.

It is another object of the present invention to provide in a bellows expansion utilizing snubber spans at either end of the bellows spans, predetermined and somewhat automatic attachment means for attachment of the bellows spans to flanges or pipes of pipe lines.

It is another object of the present invention to provide an improved expansion unit utilizing snubber spans to increase its ability to accept expansion and contraction of the pipe lines to which it may be connected.

Various other objects, advantages and features of the invention will be apparent from the following specification, when taken in connection with the accompanying drawings, wherein the preferred embodiment is set forth for purposes of illustration.

In the drawings:

FIGURE 1 is a view in perspective of a bellows expansion unit embodying the invention;

FIGURE 2 is a view in elevation showing the bellows expansion unit and its means for attachment to a pipe at one end and to a flange at the other end, the upper half of the unit being shown in cutaway half section and embodying the inventive construction;

FIGURE 3 is a view in elevation of the bellows expansion unit embodying the present invention, showing the movement of the snubber and bellows spans in lateral or parallel offset;

FIGURE 4 is a view in elevation showing the movement of the snubber and bellows spans movements in angular bending from the center line of the expansion unit.

Adverting specifically to the construction of FIGURE 1, we have shown therein a complete expansion unit 10 having a plurality of corrugated spans 12, which are referred to as bellows spans 12. It is normally known that bellows may be fabricated by suitable means such as drawing or forming and then welding a cylindrical blank from sheet stock, followed by corrugating operatings such as rolling or other like forming operations, in order to provide the corrugations.

At either end of the bellow spans 12 may be formed a pair of snubber spans 14 and 16. The snubber spans 14, 16 are integrally formed (as is more clearly shown in FIGURE 2) with the bellows spans 12, terminating in ends 18 and 20 of the combined corrugated spans 12 and snubber spans 14, 16. Therefore the entire bellows spans and snubber spans from 18 to 20 may be formed as a single unit.

Bellows spans 12 are provided with a desired predetermined diameter 21. The predetermined diameter 21 is that of the extreme or outside diameter of each of the bellows spans 12, each of which spans employs that uniform diameter 21. On either end of the bellows spans 12 the snubber spans 14 and 16 are formed and both are of the same diameter 22. Diameter is substantially less than the predetermined diameter 21 of the bellows spans.

We have, therefore, as the preferred construction, a plurality of like bellows spans 12, each interformed the one with the other, provided with the predetermined diameter 21. Spans 12 terminate at either end thereof in snubber spans 14 and 16, interformed with either end of the bellows spans as an integral portion thereof to transmit expansion, contraction, offset angularity and any combination of these motions. Snubber spans 14, 16 have a diameter 22 substantially less than that of the bellows spans 12. There is therefore greater resilience or expansion and contraction motion in the bellows spans 12, than there is in the snubber spans 14, 16. The snubber spans 14, 16 transmit a greater portion of that motion to the bellows spans 12, and react slightly less to the expansion and contraction and other movement than do bellows spans 12. Thus the amount of fatigue of snubber spans 14, 16 is reduced and a greater amount of the motion is transmitted to the remaining bellows spans 12, for a more uniform action of the bellows spans in response to the transmitted motion.

Referring more particularly to FIGURE 2, we see that snubber spans 14, 16 terminate the corrugated spans of the expansion unit in ends 18 and 20. Means 24 and 26 are joined with the free ends 18 and 20, respectively, of the snubber spans 14, 16 for adapting the unit to pipe line connections such as the pipe 28 itself, or a flange 30.

The means 24 and 26 may be made substantially identical. Therefore I will explain only how the means 24 is made, and it should be understood that means 26 may be made the same. Means 24 includes an attachment collar 32 disposed adjacent the end 18 of snubber 14. The end 18 is positioned preferably within the internal dimension of collar 32. About the exterior of the collar 32 may be positioned a plurality of outer stop means, shown in FIGURE 1 as clips 34, and in FIGURE 2 as a stop ring 36. The position at which the clips 34 or the ring 36 is placed on the attachment collar 32 is such as to provide a predetermined distance 40, in each case, to form a predetermined connecting surface 42 about the exterior of the attachment collar 32. Connecting surface 42 provides the automatic connecting surface desired for receiving about surface 42 a connecting flange 30, for example. A like dimensioned connecting surface 46 is also provided within the internal diameter of the connecting ring 32 by placement therein of an inner stop ring 44, thus providing a connecting surface for pipe 28. Each of the connecting surfaces are so dimensioned as to automatically receive the length of pipe or flange desired to be inserted therein or thereupon. The predetermined connecting surface 46 is of a like surface dimension as that of the connecting surface 42. Thus it is shown that the connecting surface is pre-selected in area on either the outside of the attachment collar, as surface 42, or the inside of the attachment collar as surface 46, to provide for more ready connection of pipe 28 within the attachment collar and flange 30 about the attachment collar 32. The attachment collar 32 may then be fastened to the pipe 28 by normal welding procedures, such as weld 48, and flange 30 secured on its inner surface to attachment collar 32 by weld 50.

In accordance with FIGURES 3 and 4, offset and angularity only are exemplified as some of the motions of the pipe line which are taken up by the bellows expansion unit. FIGURE 3 shows the motion of offset from the center line such as parallel offset of one pipe line with respect to the other. The offset 54 exemplifies snubber span and bellows spans motion showing a uniformly distributed motion accepted by the bellow spans 12.

In FIGURE 4, angular bending or rotation from the center line 60 is demonstrated to the new bending line or the center line of the unit 62, at an angular dimension 64. The great amount of motion accepted by the bellows spans 12 as a result of more limited operation of the snubbers spans 14 and 16 is exemplified. Of course like showings may also be made for the combination motions as well as axial motions, namely traversing in the compression or expansion along the axis or length of the unit.

It should be understood further that the units 10 as shown in FIGURES 1 and 2 are shown at their neutral or free position.

Through the use of the snubber spans 14, 16 with the bellows spans 12, it has been shown that the motion of the expansion unit 10 is more easily and uniformly distributed through the bellows spans 12. Also, the expansion unit 10 is quite flexible in its relatively automatic manner of receiving pipes to be connected thereto such as pipe 28 and flanges 30 through the use of means 24 exemplified FIGURE 2. The ease and rapidity with which the expansion unit may be inserted in a pipe line is also greatly enhanced through these simplified means 24 and 26.

The particular embodiment of the invention illustrated and described herein is illustrative only and the invention includes such other modifications and equivalents as may readily appear to those skilled in the art, within the scope of the appended claim.

I claim:

A bellows expansion unit for use in pipe lines utilizing expansion joints, said expansion unit comprising a plurality of like bellow spans, each interformed and integral with one another, said bellow spans having a predetermined diameter, snubber spans having a diameter less than the predetermined diameter, said snubber spans being interformed at each end of the bellow spans, and being integral with said bellow spans and terminating in an axially disposed extension of said bellows, a pair of attachment collars, one each disposed around the outside of said extension and connected with the terminus of each snubber span and inner stop rings disposed within said extensions, radially inwardly of said attachment collars, and outer stop means consisting of a plurality of angular clips secured to the outer surface of said attachment collar, said stop rings and clips providing predetermined connecting surfaces for selectively receiving pipe and flange connections thereon, said predetermined connecting surfaces being those surfaces preselected as desired for selectively limiting insertion of the pipe into the unit and the flange onto the unit.

References Cited by the Examiner
UNITED STATES PATENTS

| | | | |
|---|---|---|---|
| 1,165,449 | 12/15 | Rietz | 285—226 |
| 1,702,066 | 2/29 | Valentine | 285—299 |
| 2,565,184 | 4/51 | Parlasca | 285—286 |
| 2,666,657 | 1/54 | Howard | 285—226 |
| 2,770,259 | 11/56 | Zallea | 137—796 |

FOREIGN PATENTS

| | | |
|---|---|---|
| 866,411 | 5/41 | France. |
| 565,433 | 11/44 | Great Britain. |

References Cited by the Applicant
UNITED STATES PATENTS

| | | |
|---|---|---|
| 2,707,972 | 5/55 | Cole et al. |
| 2,832,613 | 4/58 | Farrar et al. |
| 3,135,295 | 6/64 | Ziebold. |

FOREIGN PATENTS

| | | |
|---|---|---|
| 533,468 | 11/56 | Canada. |

CARL W. TOMLIN, *Primary Examiner.*